C. B. BRISTOL.

Snap-Hooks.

No. 5,639. Reissued Nov. 4, 1873.

Witnesses.

J. H. Shumway

A. J. Tibbits

C. B. Bristol
Inventor

By Atty.

John E. Earle

AM. PHOTO-LITHOGRAPHIC Co. N.Y. (OSBORNE'S PROCESS)

UNITED STATES PATENT OFFICE.

CHARLES B. BRISTOL, OF NEW HAVEN, CONNECTICUT.

IMPROVEMENT IN SNAP-HOOKS.

Specification forming part of Letters Patent No. 55,050, dated May 29, 1866; reissue No. 5,639, dated November 4, 1873; application filed September 24, 1873.

*To all whom it may concern:*

Be it known that I, CHARLES B. BRISTOL, of New Haven, in the county of New Haven and State of Connecticut, have invented a new Improvement in Snap-Hooks; and I do hereby declare the following, when taken in connection with the accompanying drawings and the letters of reference marked thereon, to be a full, clear, and exact description of the same, and which said drawings constitute part of this specification, and represent, in—

Figure 1:
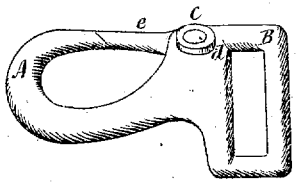
Figure 2:
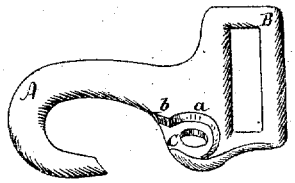
Figure 3:
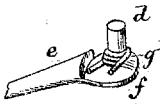
Figure 4:
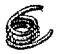

Figure 1, a perspective view; Fig. 2, a perspective view, the tongue removed; Fig. 3, a perspective view of the tongue, and in Fig. 4, a perspective view of the spring removed.

This invention relates to an improvement in the article known to the trade as snap or harness hooks; and it consists in forming the hook with a single cheek, and the latch with a corresponding cheek, the said cheeks forming the two sides of a spring-chamber, connected together by a pivot through the said chamber from one cheek to the other, and a spring within the said chamber to hold the latch in its closed position, and allow the latch to be opened.

A is the hook proper, and B the eye, shown as formed, in a plane with the hook, so that the hook and eye may be molded in their proper relative position, and avoid the twisting necessary in the usual construction, where the eye is required to be at right angles to the hook. On the rear end or base of the hook a cheek, *c*, is formed, corresponding to one of the cheeks in the usual construction, and from this a flange or metal of the hook projects, to form a recess or chamber, *a*, in the base of the hook, as seen in Fig. 2. The latch *e* is made with a cheek, *f*, corresponding to the cheek *c* on the hook, and in such relative position to the latch that, when placed over the chamber *a* will cover the said chamber, and the latch be in central line, so as to close the space between the point of the hook and the base, as seen in Fig. 1. The pivot *d* is represented as formed on the cheek of the latch, and so as to pass through a corresponding perforation on the cheek of the hook, and there riveted or secured, so as to allow the free action of the latch.

A spring, *g*, is arranged around the pivot and within the chamber, one arm of which bears against the latch, and the other against the shoulder *b*, or other convenient point on the hook.

I claim as my invention—

The hook A and eye B constructed with the single cheek *c*, combined with the latch *e* constructed with a corresponding cheek, *f*, the two said cheeks forming two sides of a chamber, *a*, within which the spring is placed to hold the latch in a closed position, substantially as set forth.

CHAS. B. BRISTOL.

Witnesses:
A. J. TIBBITS,
J. H. SHUMWAY.